United States Patent
Bhaggan et al.

(10) Patent No.: US 11,425,917 B2
(45) Date of Patent: Aug. 30, 2022

(54) FAT COMPOSITION

(71) Applicant: Bunge Loders Croklaan B.V., Wormerveer (NL)

(72) Inventors: Krishnadath Bhaggan, Wormerveer (NL); Jeanine Luvelle Werleman, Wormerveer (NL)

(73) Assignee: Bunge Loders Croklaan B.V., Wormerveer (NL)

(*) Notice: Subject to any disclaimer, the term of this patent is extended or adjusted under 35 U.S.C. 154(b) by 223 days.

(21) Appl. No.: 16/486,302

(22) PCT Filed: Feb. 16, 2018

(86) PCT No.: PCT/EP2018/053902
§ 371 (c)(1),
(2) Date: Aug. 15, 2019

(87) PCT Pub. No.: WO2018/149974
PCT Pub. Date: Aug. 23, 2018

(65) Prior Publication Data
US 2020/0060304 A1    Feb. 27, 2020

(30) Foreign Application Priority Data

Feb. 17, 2017 (EP) .................................. 17275022

(51) Int. Cl.
*A23D 9/007* (2006.01)
*A23D 9/04* (2006.01)
(Continued)

(52) U.S. Cl.
CPC ............... *A23D 9/007* (2013.01); *A23D 9/04* (2013.01); *A23G 1/36* (2013.01); *A23G 3/40* (2013.01); *A23G 2200/08* (2013.01)

(58) Field of Classification Search
CPC ........ A23D 9/007; A23D 13/14; A23D 13/19; A23D 9/00; A23D 9/013; A23D 9/04;
(Continued)

(56) References Cited

U.S. PATENT DOCUMENTS

| 4,705,692 A | 11/1987 | Tanaka et al. |
| 5,858,427 A | 1/1999 | Cain et al. |

(Continued)

FOREIGN PATENT DOCUMENTS

| CN | 1643121 A | 7/2005 |
| JP | H10-506285 A | 6/1998 |

(Continued)

OTHER PUBLICATIONS

International Search Report issued in corresponding International Patent Application No. PCT/EP2018/053902 dated Mar. 23, 2018.
(Continued)

*Primary Examiner* — Erik Kashnikow
*Assistant Examiner* — Assaf Zilbering
(74) *Attorney, Agent, or Firm* — Morgan, Lewis & Bockius LLP

(57) ABSTRACT

The invention provides a non-trans, non-hydrogenated fat composition comprising less than 45 wt. % saturated fatty acids (SAFA) based on the total fatty acids in the composition, and a solid fat content (SFC) melting curve wherein the change in solid fat content from N35-N25 is at least 15 and wherein N35 is less than 3.

19 Claims, 1 Drawing Sheet

Sensory evaluation

(51) Int. Cl.
*A23G 1/36* (2006.01)
*A23G 3/40* (2006.01)

(58) Field of Classification Search
CPC .......... A23G 1/36; A23G 3/0063; A23G 3/40; A23G 2200/08
See application file for complete search history.

(56) References Cited

U.S. PATENT DOCUMENTS

2009/0092713 A1* 4/2009 Cleenewerck .......... A23G 1/30 426/607
2010/0215811 A1 8/2010 Favre et al.

FOREIGN PATENT DOCUMENTS

| JP | 2009-525739 A | 7/2009 | | |
|----|----|----|----|----|
| JP | 2012-525857 A | 10/2012 | | |
| WO | 2006/053097 A1 | 5/2006 | | |
| WO | 2007/090869 A1 | 8/2007 | | |
| WO | 2009/013473 A1 | 1/2009 | | |
| WO | WO-2009013473 A1 * | 1/2009 | .............. | A23G 1/54 |
| WO | 2010/130395 A1 | 11/2010 | | |

OTHER PUBLICATIONS

Written Opinion issued in corresponding International Patent Application No. PCT/EP2018/053902 dated Mar. 23, 2018.
Neri et al., "Identification of cocoa butter equivalents added to cocoa butter by fatty acid composition of the triacylglycerol subfractions separated by Ag+-HPLC-II," European Food Research and Technology, 208 (3): 198-202 (1999).
Torbica et al., "The advantages of solid fat content determination in cocoa butter and cocoa butter equivalents by the Karlshamns method," European Food Research and Technology, 222: 385-391 (2005).
Rajah, ed., "Fats in Food Technology: fats for chocolate and sugar confectionery," 2nd edition, 177-178 (2014).
Bootello et al., "Evaluation of high oleic-high stearic sunflower hard stearins for cocoa butter equivalent formulation," Food Chemistry, 134 (3): 1409-1417 (2012).
Gunstone, ed., "The Lipid Handbook with DC-ROM," 3rd edition, 55 (2006).
Notice of Reasons for Rejection issued in corresponding Japanese Patent Application No. 2019-544708 dated Nov. 24, 2021 (see partial English translation).
Office Action issued in corresponding Chinese Patent Application No. Chinese Application No. 201880012300.8, dated Mar. 9, 2022.

* cited by examiner

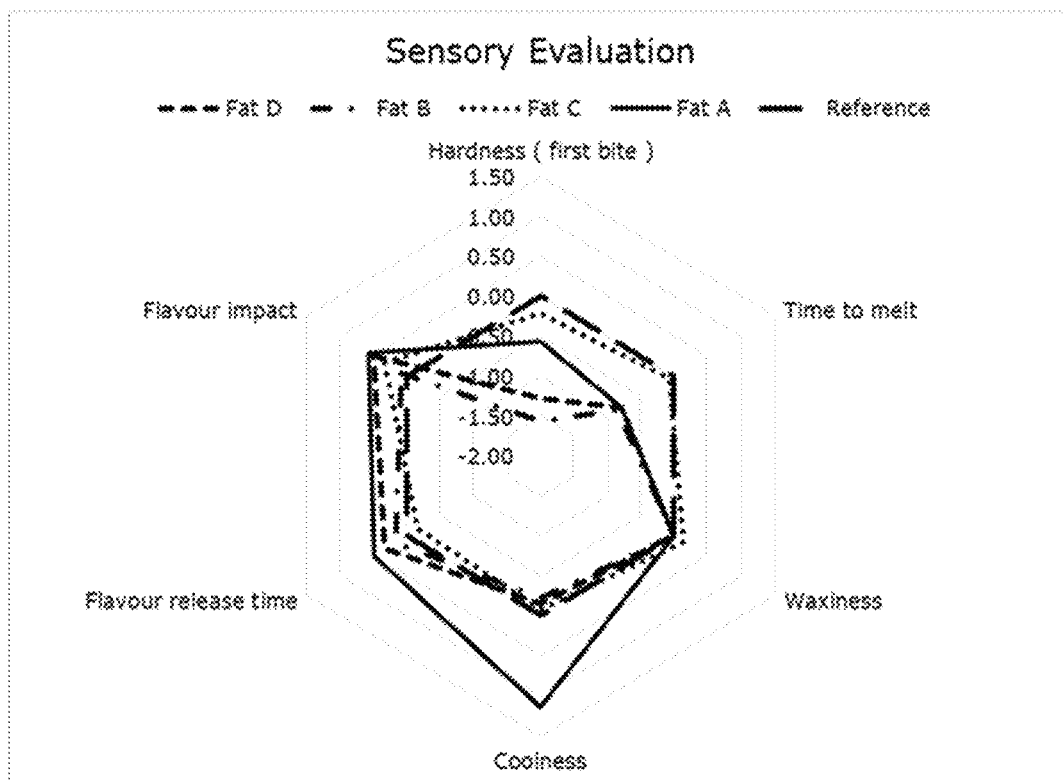
Sensory evaluation

FAT COMPOSITION

This invention relates to a fat composition, confectionery products comprising the composition, the use of the composition in a confectionery product and methods of making the fat composition.

Many confectionery products such as chocolate and chocolate-like products contain triglyceride fats. The fats impart beneficial textural and organoleptic properties to the products. For example, the flavour release and taste experience of confectionery products at least partly depends on the melting profile of the triglyceride fats that it contains.

Some types of triglycerides fats provide a so-called cool melting effect to confectionery products. The cool melting effect involves the sensory experience of a significant temperature drop during the melting of the confectionery product in the mouth.

It is desirable to provide fat compositions having a better nutritional value in terms of reduced level of saturated fatty acids (SAFA). However, lowering the SAFA content typically affects the physical properties and sensory experience of the confectionery product.

It would be desirable to provide fat compositions suitable for use in confectionery products which provide a cool melting sensation in the mouth while at the same time having a reduced level of SAFA.

WO 2007/090869 describes edible products with low content of saturated and trans unsaturated acids.

According to the present invention, there is provided a fat composition comprising less than 45 wt. % saturated fatty acids (SAFA) based on the total fatty acids in the composition, wherein the change in solid fat content from N35-N25 for the composition is at least 15, or greater than 15, and wherein N35 for the composition is less than 3.

The composition is typically a non-trans, non-hydrogenated composition. By "non-trans, non-hydrogenated", it is intended to mean that saturated fatty acids in the composition have not been obtained by the reduction of unsaturated fatty acids with hydrogen The fat composition of the invention typically shows a sharp melting profile in the region 25-35 deg C. From these fat compositions confectionery products can be made with a cool melting sensation in the mouth, whereas the feeling in the mouth of "waxiness" is reduced.

It has been surprisingly found that the fat composition of the invention can provide a very cool melting sensation when compared to similar compositions with more or less the same saturated fatty acid (SAFA) level. Low SAFA fats would not have been expected to have cool melting properties when applied in confectionery products (e.g. confectionery filling fats), as lowering saturated fatty acids usually results in softer products and will have less effect on the steepness of the melting curves.

The concept of coolness is described in Application of fats in confectionery by Geoff Talbot (published by Kennedy's Publications Ltd in 2006), Chapter 1.6.1. Melting characteristics. This Chapter describes the characteristic of coolness and the correlation with solid fat content (SFC) profile and is incorporated by reference herein.

N-values (Solid Fat content (SFC)) as described herein are typically determined using NMR spectroscopy according to the IUPAC 2.150b method, stabilized at 20° C. for 24 hours. Solid fat contents are abbreviated to, for example, N20 (percentage of solid fat at 20° C.), N25 (percentage of solid fat at 25° C.) etc.

The fat composition of the invention has a solid fat content defined by an N35 of less than 3. Preferably, the N35 of the composition is less than about 2, more preferably less than about 1, such as less than about 0.5, or less than about 0.4, or less than about 0.3. The low value of N35 helps to provide the compositions of the invention with a less waxy mouthfeel.

In the composition of the invention, the solid fat content of the composition may be reduced by at least about 15 (or 15%) or more as the temperature is increased from 25 to 35 ° C. Preferably the N35 value may be at least 15 (or 15%) less than the N25 value for the same fat composition measured under the same conditions.

Preferably, the fat composition of the invention may have a change in solid fat content from N35-N25 of at least 17 (or 17%) or greater than 17. More preferably, the change may be at least 18 or 18%, or greater such as at least 18.8 or 18.8%, or greater. More preferably, the solid fat content may be reduced by at least 17 or 18, or more, as the temperature increases from 25 to 35 ° C. (N25 to N35).

The compositions of the invention preferably also have an N20 of equal to or greater than 20 or 25, more preferably greater than 30, such as from 20 to 40, preferably from 25 or 30 to 35. N-values (Solid Fat content (SFC)) are determined using NMR spectroscopy according to the IUPAC 2.150b method.

The term "fatty acid", as used herein, refers to straight chain saturated or unsaturated (including mono- and poly-unsaturated) carboxylic acids having from 8 to 24 carbon atoms. A fatty acid having n carbon atoms and x double bonds may be denoted Cn:x. For example, palmitic acid may be denoted C16:0 and oleic acid may be denoted C18:1. Percentages of fatty acids in compositions referred to herein include acyl groups in tri-, di- and mono- glycerides present in the glycerides as is customary terminology in the art and are based on the total weight of C8 to C24 fatty acids. The fatty acid profile (i.e., composition) may be determined, for example, by fatty acid methyl ester analysis (FAME) using gas chromatography according to ISO 15304.

In the fat composition of the invention, preferably the fat composition comprises less than or equal to 40 wt. % saturated fatty acids (SAFA), preferably from 30-40 wt. % SAFA, based on the total fatty acids in the composition.

Typically, the fat composition of the invention comprises total monounsaturated fatty acids (MUFA) in an amount of less than 55 wt. % based on the total fatty acids present in the composition, such as less than 50 wt. %, for example from 40 to 50 wt. %.

Preferably, the fat composition according to the invention comprises less than 20 wt. % polyunsaturated fatty acids (PUFA) based on the total fatty acids in the composition, more preferably less than 15 wt. %, such as from 12 to 16 wt. %.

The term "fat" refers to glyceride fats and oils containing fatty acid acyl groups and does not imply any particular melting point. The term "oil" is used synonymously with "fat". Fats predominantly comprise triglycerides.

Amounts of triglycerides specified herein are percentages by weight based on total triglycerides present in the fat composition. The notation triglyceride XYZ denotes triglycerides having fatty acid acyl groups X, Y and Z at any of the 1-, 2- and 3- positions of the glyceride. The notation $A_2B$ includes both AAB and ABA, and $AB_2$ includes both ABB and BAB. Triglyceride content may be determined for example by GC (ISO 23275).

Preferably, the fat composition of the invention as described herein comprises more than 8 wt. % StOSt triglycerides, preferably more than 10 wt. % more preferably from 10-15% wt. % based on the total triglycerides in the composition.

As used herein, "P" is palmitic acid, "O" is oleic acid and "St" is stearic acid.

Typically, the fat composition of the invention as described herein comprises less than 40 wt. % POP triglycerides, preferably less than 35 wt. %, more preferably from 25-40% wt. % based on the total triglycerides in the composition.

Advantageously, in the fat composition of the invention as described herein, the POP/StOSt weight ratio is preferably less than 10 or less than 5, more preferably from 1 to 4, even more preferably from 2 to 3.

Preferably, the fat composition of the invention as described herein comprises O16:0 20-35 wt. %, more preferably, 23-30 wt. %; C18:0 8-15 wt. %, more preferably 10-13 wt. % and 18:1 35-55 wt. %, more preferably 40 to 50 wt. %, based on the total fatty acids in the composition.

The fat composition of the invention may have a C22:0 content of less than 0.4 wt. % based on the total weight of fatty acids in the composition, such as less than 0.3 wt. %, or about 0.2 wt. %.

Palm mid fraction (PMF) is a fraction of palm oil which is high in POP triglyceride. It is obtained through re-fractionation, either from the palm olein or palm stearin. Shea stearin is a fraction of shea butter which is high in StOSt triglycerides. It is obtained through fractionation of shea butter.

The fat composition of the invention may comprise a mixture or blend of a palm mid fraction, shea stearin and a liquid oil. The palm mid fraction preferably has an Iodine Value of 30 to 40, more preferably from 32 to 36. The Iodine Value may be determined using methods known in the art. The liquid oil may be selected from the group consisting of of sunflower oil, soybean oil, rapeseed oil, safflower oil, corn oil, palm olein, shea olein, and mixtures thereof. Preferably the liquid oil is rapeseed oil and the palm mid fraction has an Iodine Value of 32 to 36.

Preferably, the fat composition comprises the palm mid fraction in an amount of from 35 to 50 wt. %, such as from 40 to 45 wt. %, shea stearin in an amount of from 10 to 30 wt. %, such as from 12 to 20 wt. % and the liquid oil, such as rapeseed oil, in an amount of from 30 to 60 wt. % such as from 40 to 50 wt. %.

The fat composition of the invention as described herein has a cool melting sensation when inserted in the mouth of a human. The human oral cavity typically has a temperature of 36.8±0.4° C.

The present invention also provides the use of a fat composition according to any of the embodiments disclosed herein in a confectionery composition or product, preferably as a filling fat.

There is also provided a confectionery product or composition, such as a confectionery filling, comprising a fat composition as described in any of the embodiments herein.

The confectionery compositions of the invention are typically useful as fillings for confectionery products and/or bakery products, wherein the products are adapted to be stored and/or sold and/or consumed at ambient temperature i.e., 10° C. to 30° C. The products are not generally frozen. The fillings may be applied to substrates such as biscuits, sponges or wafers and may be impregnated into the wafers. The biscuits, sponges or wafers can be present as single layers or in multiple layers with the filling between adjacent layers.

The fillings may be covered with an outer layer of chocolate, either when applied on biscuits, sponges or wafers, or when not so applied. Thus, a preferred confectionery product of the invention comprises a chocolate outer layer filled with the composition of the invention, optionally comprising a biscuit, sponge or wafer in association with the filling. Typically, the outer layer of chocolate will encapsulate the filling and the biscuit or wafer, if present. The confectionery product may be a bar, optionally divided into segments. The segments may be adapted to allow part of the product to be broken off by the user and consumed separately from the remainder of the product.

In another embodiment, a bakery composition of the invention comprises a baked product having a filling comprising a confectionery composition of the invention. Baked products include bread, cakes, biscuits and sponges. A baked product may comprise a biscuit, sponge or wafer comprising two or more layers of biscuit, sponge or wafer, with the filling between adjacent layers. The bakery product may comprise two layers of biscuit, sponge or wafer with the filling sandwiched between the layers.

The filled confectionery products and the bakery products will generally be packaged, for example in a wrapper, for sale.

The compositions of the invention comprise one or more confectionery additives selected from sugar, whey powder, skimmed milk powder, milk fat, anhydrous milk powder, lecithin, methyl vanillin, cocoa powder, milk powder, yoghurt powder, flavouring and emulsifier. Preferably, the compositions comprise at least sugar, whey powder, skimmed milk powder, anhydrous milk powder and, optionally, one or more of the other components. Other compositions comprise at least sugar and flavouring and, optionally, one or more of the other components. Additional components such as milk, water, colouring agents and preservatives, more preferably colouring agents and preservatives, may optionally be present in the compositions. Sugar includes sucrose, dextrose and fructose (preferably sucrose). Flavourings include, for example, strawberry, raspberry, vanilla, mint, orange, lemon, lime, coffee and the like. An example of a suitable emulsifier is lecithin. Preferably, the compositions of the invention do not contain nut solids (e.g., from peanuts, almonds, hazelnuts, walnuts, cashew nuts, pistachio nuts, macadamia nuts and pecan nuts), such as nut paste.

Typically, confectionery compositions of the invention will comprise the fat composition of the invention in an amount of from 5 to 70% by weight, more preferably from 10 to 60% by weight, even more preferably from 20 to 50% by weight, such as from 30 to 40% by weight. Additionally compositions of the invention may comprise sugar (e.g., sucrose) in an amount of from 10 to 80% by weight, more preferably from 20 to 70% by weight, even more preferably from 30 to 60% by weight. Cocoa powder, when present in the compositions of the invention, is preferably present in an amount of from 2 to 20% by weight. Other components, such as milk fat, whey powder, skimmed milk powder, and anhydrous milk powder, as well as lecithin and methyl vanillin, will preferably be present in an amount of from 0.01 to 30% by weight. It will be appreciated that the percentage figures will total 100%.

One preferred composition of the invention comprises the fat composition in an amount of from 10 to 60% by weight, sugar in an amount of from 20 to 70% by weight, optionally cocoa powder in an amount of from 2 to 20% by weight and from 0.01 to 30% by weight of one or more, preferably all, of skimmed milk powder, milk fat, flavouring and emulsifier, such as lecithin.

Compositions of the invention may be made by combining one or more confectionery additives selected from sugar, cocoa powder, milk powder, yoghurt powder, flavouring and emulsifier, with the fat blend. Typically, the components will be mixed at a temperature at which the fat blend is molten (e.g., at greater than 40° C., such as from 50-80° C.).

Confectionery products of the invention may be made, for example, by filling an edible substrate with a confectionery composition according to methods well known in the art. Suitable edible substrates include biscuits, wafers and chocolate shells.

The term "fat", as used herein, is not intended to imply any particular state and is intended to cover those triglyceride fats that are liquid at room temperature and are also sometimes referred to as oils.

The present invention also provides a method of preparation of a fat composition according to the invention as defined herein, comprising the mixing of one or more triglyceride containing components and a liquid oil. The triglyceride containing components and the liquid oil may be mixed using any suitable means known in the art, such as a blender.

The one or more triglyceride containing components preferably comprises a palm mid fraction and shea stearin.

The listing or discussion of an apparently prior-published document in this specification should not necessarily be taken as an acknowledgement that the document is part of the state of the art or is common general knowledge.

Preferences and options for a given aspect, embodiment, feature or parameter of the invention should, unless the context indicates otherwise, be regarded as having been disclosed in combination with any and all preferences and options for all other aspects, embodiments, features and parameters of the invention.

The following non-limiting examples illustrate the invention and do not limit its scope in any way. In the examples and throughout this specification, all percentages, parts and ratios are by weight unless indicated otherwise.

EXAMPLES

Reducing saturated fatty acids in fat formulation usually results in softer products and unstable texture. With the development of low SAFA alternatives for confectionery filling fats having a SAFA level of higher than 50 g/gram fat, we found that similar texture could be achieved with lower SAFA content (30-40% lower SAFA).

On top of that, we surprisingly found that one of the fat formulations was giving a very cool melting sensation when compared to other alternatives with more or less the same SAFA level. Regarding coolness: Geoff Talbot has described in his book "Application of fats in confectionery" about this characteristic and the correlation with SFC profile.

Example 1

Different fat mixtures (samples A, B, C and D) were prepared by blending different components/fractions in order to obtain formulations having a saturated fatty acid (SAFA) level of between 35 and 40%.

The formulations were based on hard palm mid fraction, Shea stearin, Rape seed oil and/or a structuring agent:

|  | Sample A | Sample B | Sample C | Sample D |
|---|---|---|---|---|
| Hard PMFIV32 (%) | 41 | 48 | 39 | 53 |
| Shea stearin (%) | 15 | — | 10 | — |
| Structuring Agent (%) | — | 5 | 5 | 5 |
| rape seed oil (%) | 44 | 47 | 46 | 42 |
| SAFA (g/100 gr fat) | 37.8 | 37.2 | 36.4 | 40 |

For the structuring agent, the commercially available CristalGreen from IOI Loders Croklaan, Wormerveer, The Netherlands, was used. As a reference, a high SAFA fat was included. Analysis of SFC melting curve, Fatty Acid Methyl Ester analysis (FAME), and triglyceride (TAG) analysis are shown in Tables 1, 2 and 3 below respectively.

TABLE 1

Physical characteristics, FAME and TAG analysis of samples

| Product | Sample D (comparative) | Sample B (comparative) | Sample C (comparative) | Sample A | Reference |
|---|---|---|---|---|---|
| S20-N20 24 h | 36.4 | 31.8 | 41.1 | 34.9 | 56.2 |
| S20-N25 24 h | 25.0 | 18.4 | 29.1 | 19.0 | 34.6 |
| S20-N30 24 h | 9.3 | 8.9 | 10.2 | 1.6 | 7.5 |
| S20-N35 24 h | 4.1 | 4.3 | 5.0 | 0.2 | 0.6 |
| S20-N40 24 h | 0.4 | 0.8 | 0.0 | 0.0 | 0.0 |

TABLE 2

FAME analysis of samples

| Product | Sample D (comparative) | Sample B (comparative) | Sample C (comparative) | Sample A | Reference |
|---|---|---|---|---|---|
| C8:0 | 0.0 | 0.0 | 0.0 | 0.0 | 0.0 |
| C10:0 | 0.0 | 0.0 | 0.0 | 0.0 | 0.0 |
| C12:0 | 0.1 | 0.1 | 0.1 | 0.1 | 0.2 |
| C14:0 | 0.5 | 0.5 | 0.6 | 0.4 | 1.0 |
| C15:0 | 0.0 | 0.0 | 0.0 | 0.0 | 0.1 |
| C16:0 | 33.7 | 31.3 | 36.3 | 25.9 | 49.4 |

TABLE 2-continued

FAME analysis of samples

| Product | Sample D (comparative) | Sample B (comparative) | Sample C (comparative) | Sample A | Reference |
|---|---|---|---|---|---|
| C17:0 | 0.1 | 0.1 | 0.1 | 0.1 | 0.1 |
| C18:0 | 3.9 | 5.4 | 4.2 | 12.3 | 5.0 |
| C18:1 | 45.3 | 45.3 | 43.5 | 45.1 | 36.4 |
| C18:2 | 10.7 | 11.2 | 10.0 | 10.6 | 6.8 |
| C18:3 | 3.8 | 4.1 | 3.5 | 3.6 | 0.2 |
| C20:0 | 0.5 | 0.6 | 0.5 | 0.7 | 0.4 |
| C22:0 | 0.2 | 0.2 | 0.2 | 0.2 | 0.1 |
| C22:1 | 0.1 | 0.1 | 0.1 | 0.1 | 0.0 |
| C24:0 | 0.1 | 0.1 | 0.1 | 0.1 | 0.1 |
| C24:1 | 0.1 | 0.1 | 0.1 | 0.1 | 0.0 |
| Others | 0.1 | 0.2 | 0.2 | 0.2 | 0.0 |
| IVFAME | 68.1 | 69.8 | 64.4 | 67.2 | 43.7 |
| Total Trans | 0.7 | 0.8 | 0.7 | 0.3 | 0.2 |
| SAFA g/100 gram fat | 37.2 | 36.4 | 40.0 | 37.8 | 53.5 |
| MUFA g/100 gram fat | 43.9 | 44.0 | 42.1 | 43.5 | 34.8 |
| PUFA g/100 gram fat | 13.7 | 14.5 | 12.8 | 13.5 | 6.6 |

TABLE 3

TAG analysis of samples

| Product | Sample D (comparative) | Sample B (comparative) | Sample C (comparative) | Sample A | Reference |
|---|---|---|---|---|---|
| MPP | 0.5 | 0.5 | 0.6 | 0.3 | 0.7 |
| MOM | 0.1 | 0.0 | 0.0 | 0.0 | 0.1 |
| PPP | 5.4 | 5.7 | 5.7 | 1.4 | 3.1 |
| MOP | 1.2 | 1.1 | 1.4 | 1.2 | 2 |
| MLP | 0.1 | 0.1 | 0.1 | 0.3 | 0.3 |
| PPSt | 1.0 | 1.2 | 1.3 | 0.3 | 0.8 |
| POP | 36.5 | 32.8 | 40.5 | 31.3 | 49.8 |
| PLP | 4.1 | 3.6 | 4.4 | 3.2 | 9 |
| C50 Others | 0.5 | 0.2 | 0.5 | 0.2 | 0.5 |
| PStSt | 0.2 | 0.2 | 0.2 | 0.1 | 0.1 |
| POSt | 6.9 | 6.4 | 7.6 | 7.1 | 8.7 |
| POO | 4.2 | 4.1 | 3.9 | 3.6 | 12 |
| PLSt | 0.6 | 0.7 | 0.9 | 0.8 | 1.6 |
| PLO | 2.3 | 2.5 | 2.2 | 2.1 | 4.3 |
| PLL | 0.9 | 0.4 | 1.1 | 1.3 | 0.8 |
| StStSt | 0.2 | 0.4 | 0.3 | 0.7 | 0 |
| StOSt | 1.6 | 3.7 | 1.9 | 13.7 | 1.7 |
| StOO | 1.0 | 1.2 | 1.1 | 1.6 | 1.3 |
| StLSt | 0.0 | 0.0 | 0.0 | 0.8 | 0.2 |
| OOO | 11.8 | 13.2 | 10.2 | 10.7 | 1.5 |
| StLO | 1.4 | 1.2 | 1.4 | 1.4 | 0.5 |
| OLO | 8.6 | 10.2 | 8.0 | 7.3 | 0.6 |
| StLL | 0.9 | 0.0 | 0.0 | 0.7 | 0.1 |
| OLL | 4.4 | 4.7 | 3.6 | 5.5 | 0.1 |
| AStSt | 1.9 | 1.8 | 1.1 | 0.0 | 0.1 |
| AOSt | 0.9 | 1.5 | 0.7 | 2.6 | 0.1 |
| AOO | 0.3 | 0.3 | 0.2 | 0.4 | 0.1 |
| ALSt | 0.9 | 0.6 | 0.4 | 0.8 | 0 |
| Others | 2.1 | 2.2 | 0.7 | 0.6 | 0.2 |
| SUMSOS | 44.9 | 42.9 | 50.0 | 52.1 | 60.2 |

Example 2

The fats from Example 1 were further evaluated in the following model application. A confectionery filling cream was prepared according to the following recipe:

| Ingredient | Wt % |
|---|---|
| Sugar | 38 |
| Fat blend (sample A) | 46 |
| Skimmed milk powder | 13 |
| Milk fat | 3 |
| Lecithin | 0.3 |
| Methyl vanillin | 0.03 |

Samples were pre-crystallized and deposit in cup and stored at 20° C. After 1 week storage, these samples were evaluated by a trained sensory panel for the following sensory attributes: Hardness, Time to melt (in the mouth), Waxiness, Coolness, Flavor release time and Flavor impact. The results are graphically represented in FIG. 1. The filling fat based on sample A showed a surprising and very distinct cool melting effect compared to the other fats.

The invention claimed is:

1. A non-trans, non-hydrogenated fat composition comprising less than 45 wt. % saturated fatty adds (SAFA) based on the total fatty adds in the composition, wherein the change in solid fat content from N35-N25 for the composition is at least 15 and wherein N35 for the composition is less than 3 and wherein the fat composition comprises less than 20 wt. % PUFA.

2. The fat composition according to claim 1, wherein N35 is less than 2.

3. The fat composition according to claim 1, wherein the change in solid fat content from N35-N25 is at least 17.

4. The fat composition according to claim 1, wherein the fat composition comprises less than 40 wt. % SAFA.

5. The fat composition according to claim 1, wherein the fat composition comprises more than 8 wt. % StOSt triglycerides based on the total triglycerides in the composition.

6. The fat composition according to claim 1, wherein the fat composition comprises less than 40 wt. % POP triglycerides, based on the total triglycerides in the composition.

7. The fat composition according to claim 1, wherein the POP/StOSt weight ratio is <10.

8. The fat composition according to claim 1, wherein the fat composition comprises C16:0 20-35 wt. %; C18:0 8-15 wt. % and 18:1 40-50 wt. %, based on the total fatty acids in the composition.

9. The fat composition according to claim 1, wherein the composition has a cool melting sensation when inserted in the mouth of a human.

10. A confectionery product comprising the fat composition according to claim 1.

11. A method of preparation of the fat composition according to claim 1, comprising mixing one or more triglyceride-containing components of the composition and a liquid oil.

12. The method according to claim 11, wherein the one or more triglyceride-containing components comprises a palm mid fraction and shea stearin.

13. The method according to claim 12, wherein the palm mid fraction has an IV of from 32 to 36.

14. The method according to claim 11, wherein the liquid oil is selected from the group consisting of sunflower oil, soybean oil, rapeseed oil, safflower oil, corn oil, palm olein, shea olein, and mixtures thereof.

15. The fat composition according to claim 1, wherein the fat composition comprises more than 10 wt. % StOSt triglycerides based on the total triglycerides in the composition.

16. The fat composition according to claim 1, wherein the fat composition comprises from 10-15 wt. % StOSt triglycerides based on the total triglycerides in the composition.

17. The fat composition accordin to claim 1, wherein the fat composition comprises less than 35 wt. % POP triglycerides, based on the total triglycerides in the composition.

18. The fat composition according to claim 1, wherein the fat composition comprises from 25-40 wt. % POP triglycerides, based on the total triglycerides in the composition.

19. The fat composition according to claim 1, wherein the POP/StOSt weight ratio is from 1 to 4.

* * * * *